United States Patent [19]
Ficker

[11] Patent Number: 5,722,550
[45] Date of Patent: Mar. 3, 1998

[54] CONTAINER HAVING REUSABLE BASE AND DISPOSABLE OVER SLEEVE

[75] Inventor: Paul J. Ficker, Cincinnati, Ohio

[73] Assignee: Buckhorn Material Handling Group, Inc., Milford, Ohio

[21] Appl. No.: 659,346

[22] Filed: Jun. 6, 1996

[51] Int. Cl.$^6$ ............................................. B65D 19/20
[52] U.S. Cl. .................. 220/4.28; 220/7; 220/400; 220/464; 206/600
[58] Field of Search ..................... 220/4.26, 4.28, 220/6, 7, 400, 402, 410, 408, 464, 415; 206/600; 229/23 A

[56] References Cited

U.S. PATENT DOCUMENTS

| | | | |
|---|---|---|---|
| 2,171,309 | 8/1939 | Luce et al. | 220/400 |
| 2,902,199 | 9/1959 | Breton . | |
| 3,797,727 | 3/1974 | Downing et al. . | |
| 3,883,027 | 5/1975 | Schneider | 200/464 |
| 4,445,614 | 5/1984 | Mitsumori et al. | 206/600 |
| 4,638,744 | 1/1987 | Clive-Smith . | |
| 4,878,313 | 11/1989 | Polesel | 206/509 |
| 4,880,141 | 11/1989 | Gossler et al. . | |
| 4,927,026 | 5/1990 | Gossler et al. . | |
| 5,094,356 | 3/1992 | Miller . | |
| 5,110,037 | 5/1992 | Pieritz, Sr. | 229/23 A |
| 5,127,527 | 7/1992 | Graham et al. . | |
| 5,279,423 | 1/1994 | Shuert . | |

FOREIGN PATENT DOCUMENTS 3-226454  10/1991  Japan .

*Primary Examiner*—Stephen J. Castellano
*Attorney, Agent, or Firm*—Fay, Sharpe, Beall, Fagan, Minnich & McKee

[57] ABSTRACT

A container for transporting products such as produce as a reusable base part including a base and support members hingedly mounted to the base that are movable between two positions. In a first position, the support members are upright, generally perpendicular to the base and in a second position the support members are retracted to a position to lie parallel with a bottom wall of the base. In the first position, an over sleeve is adapted to slide over the support members along opposite end walls of the container and fit into the base along opposite side walls of the container. Bottom wall flaps of the over sleeve extend part way across the bottom wall of the container and produce contained therein pushes down on the bottom flaps to maintain engagement of the over sleeve with the base. The base and support members are made of a reusable material, such as plastic whereas the over sleeve is made of cardboard, which can be discarded or recycled after use.

7 Claims, 13 Drawing Sheets

5,722,550

1

CONTAINER HAVING REUSABLE BASE AND DISPOSABLE OVER SLEEVE

FIELD OF THE INVENTION

The invention relates to a container for containing a product, such as produce for example, that has a reusable, returnable base part with a bottom wall and a disposable over sleeve part providing side/end walls for the container.

BACKGROUND OF THE INVENTION

Products, such as produce, and in particular fruit, such as bananas or grapes, etc., are typically transported in a distribution system that uses containers for shipping the product from a packing plant to a distribution facility, such as a warehouse, and to retail outlets, such as grocery stores, for sale to consumers. Cardboard boxes are typically used for shipping such products, and after one use, the cardboard boxes are disposed of by recycling, for example. The cardboard boxes generally cannot be reused since they become damaged or soiled the first time they are used.

Reusable containers are used in the transport and distribution of many products in wholesale and retail distribution operations, but not generally in the shipping or distribution of products that can soil during shipment, such as produce. One reason is that reusable containers must be shipped from the end use locations, for example retail grocery outlets, back to the fruit processing plants which are often in different countries, creating a return transportation problem for the users of the containers. Another reason is that the containers are relatively expensive to put into use for the first time, even though the continued use of such containers reduces the effective cost of their use over time.

Additionally, there is a known potential theft problem and, to a lesser degree, a breakage problem that creates the need to continue adding such containers to the initial number of containers that are put into service to maintain an adequate supply for a typical large scale distribution operation. In particular, with regard to the theft problem, it can become very expensive to maintain a distribution operation using reusable containers when many of the containers need to be replaced. The use of cardboard containers, therefore, has heretofore dominated the industry of shipping produce, even though the use of reusable containers would provide many advantages that are readily apparent from the viewpoint of rigidity and dependability that ultimately would ensure a low percentage of wasted product due to damage caused during shipping and a decreased shipment cost over time.

SUMMARY OF THE INVENTION

It is an object of the invention to provide a container for products, such as produce, that are at least partly reusable. In this regard, the present invention includes a reusable base made of a durable material, such as plastic, that works with a disposable or recyclable over sleeve structure, made of cardboard for example, to form the container from the two parts.

According to the invention, a base of a container is provided that has hingedly mounted side or end wall mounted support members (hereinafter support members) that are movable between two different positions. In one position, the support members are positioned upright with respect to the base to accept an over sleeve part made of disposable or recyclable material (referred to hereinafter as a cardboard sleeve or over sleeve structure without

2 limitation) that fits around the support members and engages the base part. The base part is reusable and the cardboard over sleeve part is disposable. In a second position, the support members are collapsed to overlie the bottom wall or otherwise fit into the reusable base to provide a nested stackable structure of minimum height that can be economically returned to the original owner for reuse with new over sleeves.

In use of the container for shipping, the support members are positioned upright and the disposable or recyclable part is formed as a rectangular over sleeve that fits over or around the support members along the end walls and into the base along the side walls to form a container from the two parts. Then, a product, such as produce, is packed in the container and the container is used in a regular manner in a distribution system effectively replacing a cardboard box. Once the contained produce is unpacked from the container at a distribution outlet, such as a warehouse or grocery store, the disposable part of the container is discarded or recycled. The reusable base part is manipulated to return the support members to a position overlying the base, which causes the base to take on a low height profile, for nestable stacking and return shipment of the bases to the produce packing plant.

It is an object of the invention to provide a reusable base part having a bottom wall with side and end wall flanges, and support members hingedly mounted to the base that provides sufficient stability in combination with an over sleeve to support stacking of full containers when the disposable sleeve part is fit around the support members and into the base with the support members in an upright position.

It is a further object of the invention to provide a base having support members that are mounted to the base and that are movable between an upright position in which they work with the over sleeve to provide the side and end walls of the container; and a position in which the support members overly or are made to be substantially parallel with the bottom wall of the base to provide a nestable, stackable base of a minimal size that can be returned to a point of origin for reuse with new over sleeves. When being returned, the stackable containers are required to take up as little space as possible so that the return shipment thereof is economical.

It is still further an object of the invention to provide a container that is at least partly reusable, wherein the returnable base part is by itself essentially unusable as a container. In this regard, the base is reusable when assembled with new over sleeves, but the new over sleeves do not need to be added to the base part until after the base part is returned to the supplier, just prior to filling the container and using it again for shipping new product.

These and other objects of the invention will become apparent from the following description of the preferred embodiments of the invention.

DETAILED DESCRIPTION OF THE PREFERRED EMBODIMENTS

Figure 1:
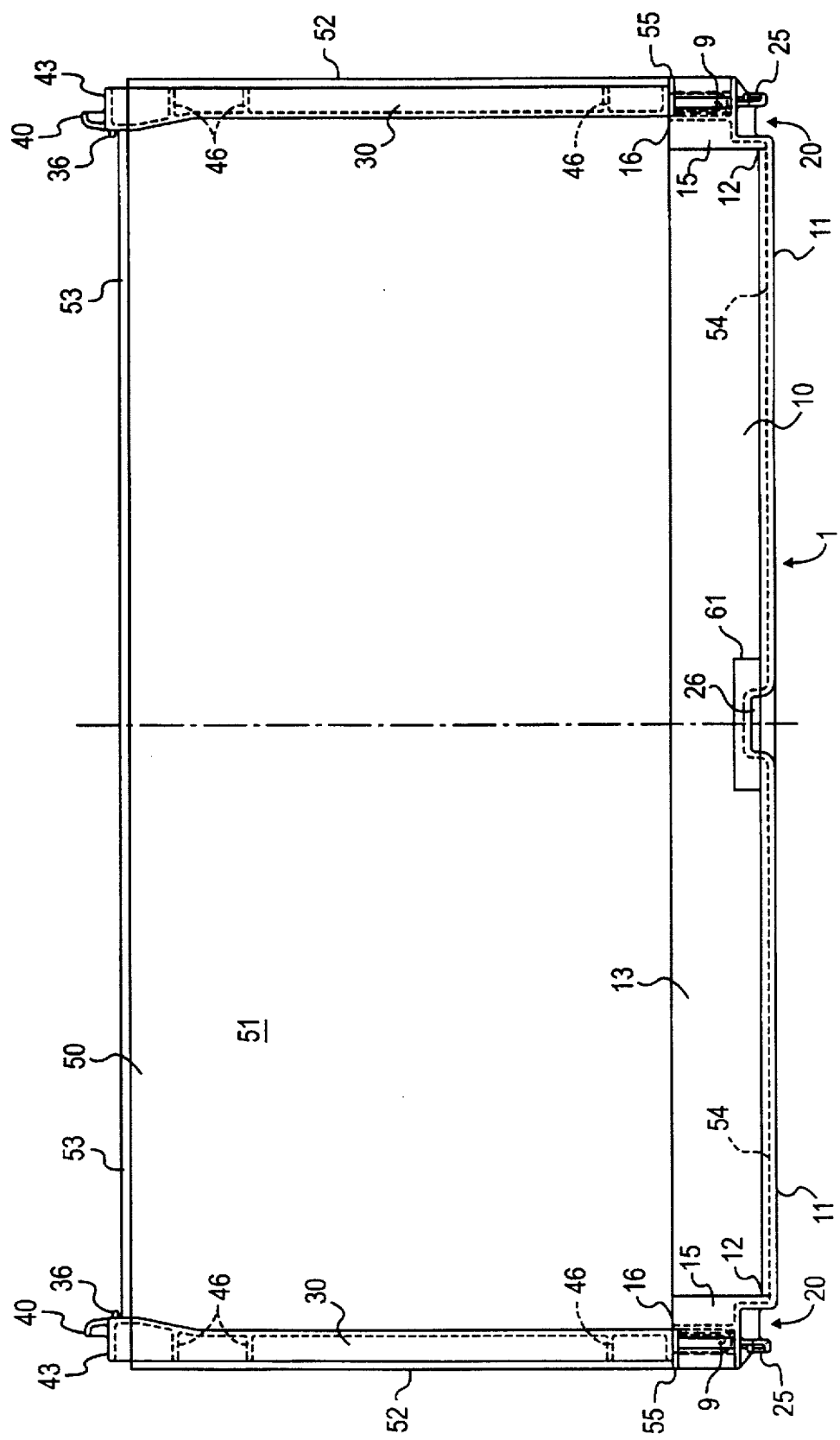
FIG. 1 is a side elevation of the assembled container of the invention including the base part with the support members and an over sleeve.
Figure 2:
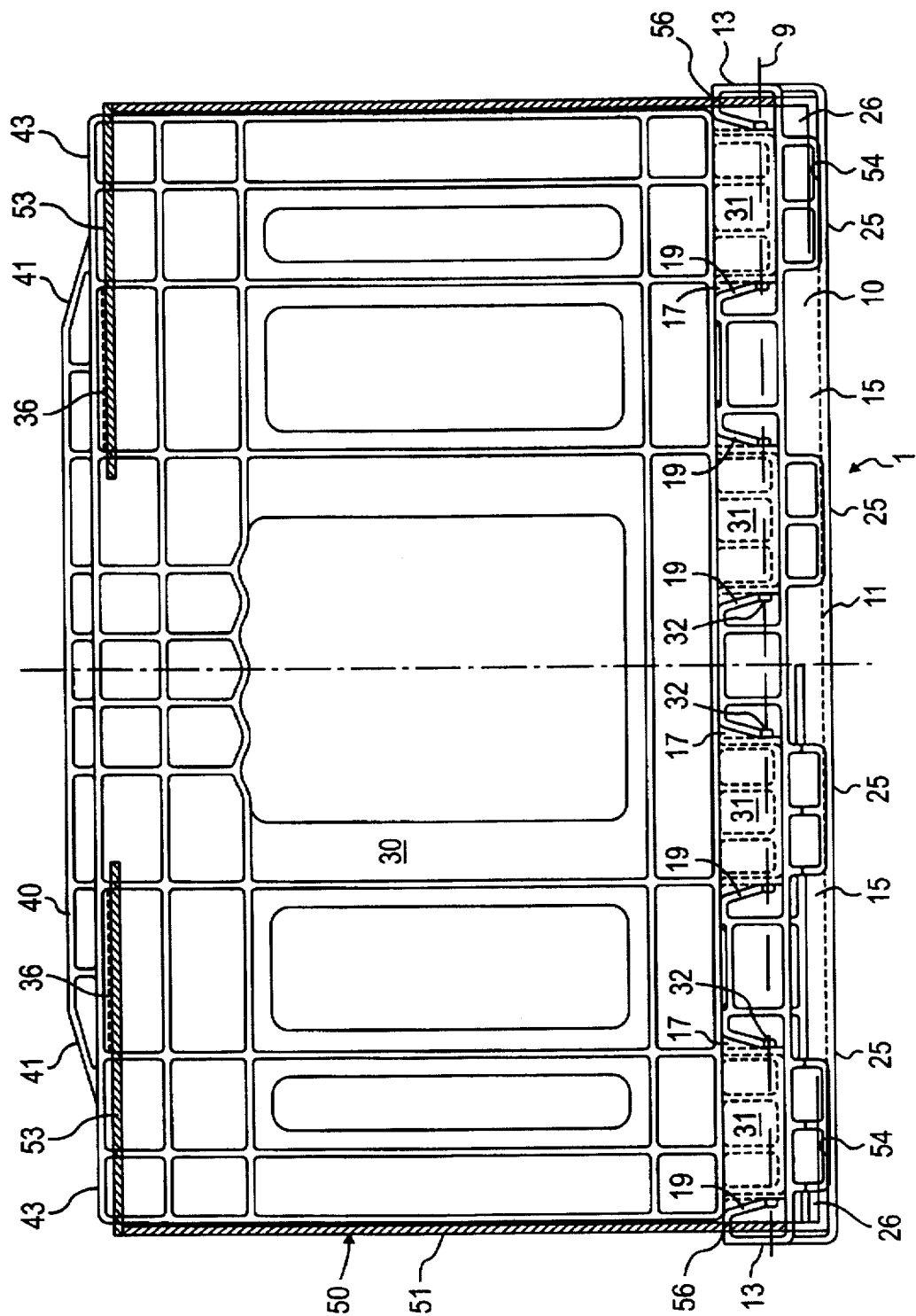
FIG. 2 is an end elevation of the assembled container shown in FIG. 1.

A container 1 constructed according to a preferred embodiment of the present invention is shown in FIGS. 1 and 2. Generally, the container has a bottom, opposite sides and opposite ends. The top of the container can be open, partially closed with lids or fully closed. As shown in the figures, the top is partially closed with lids.

The container is suitable for containing produce items, such as fruits and vegetables, and is adapted to replace the use of cardboard boxes in existing distribution systems for produce, for example. The container has a base part including a base 10 and support members 30 and an over sleeve 50 that slides over the base 10 when the support members 30 are rotated about a hinge axis 9 to the position shown in FIGS. 1 and 2. As will become apparent, with the support members 30 in the position as shown in these figures, the over sleeve 50 can be fit to slide over the support members 30 along the ends and partially into the interior of the base 10 along the sides for providing a container that is assembled on site just before produce or other products are packed into the container.

Base 10 is constructed of a durable material, such as plastic and is designed to be molded using plastic molding techniques, according to a preferred embodiment of the invention. Also, it is preferred that support members 30, which are hingedly mounted to base 10, form a part of the returnable base are formed of plastic by injection molding techniques so that the base 10 and support members 30, together forming the base part of the container can be returned to a produce or product packing facility after use of the container for shipping. On the other hand, sleeve 50 is intended, according to a preferred embodiment of the invention, to be constructed of cardboard or like material designed to have a short useful life, for example lasting only during the time of shipment of produce from a packing facility to an end use facility, such as a retail distribution outlet. The over sleeve can then be recycled or discarded in any suitable manner, and once the base part is returned to the packing facility, a new over sleeve can be fit onto the base and the assembled container reused for shipping.

Figure 9:
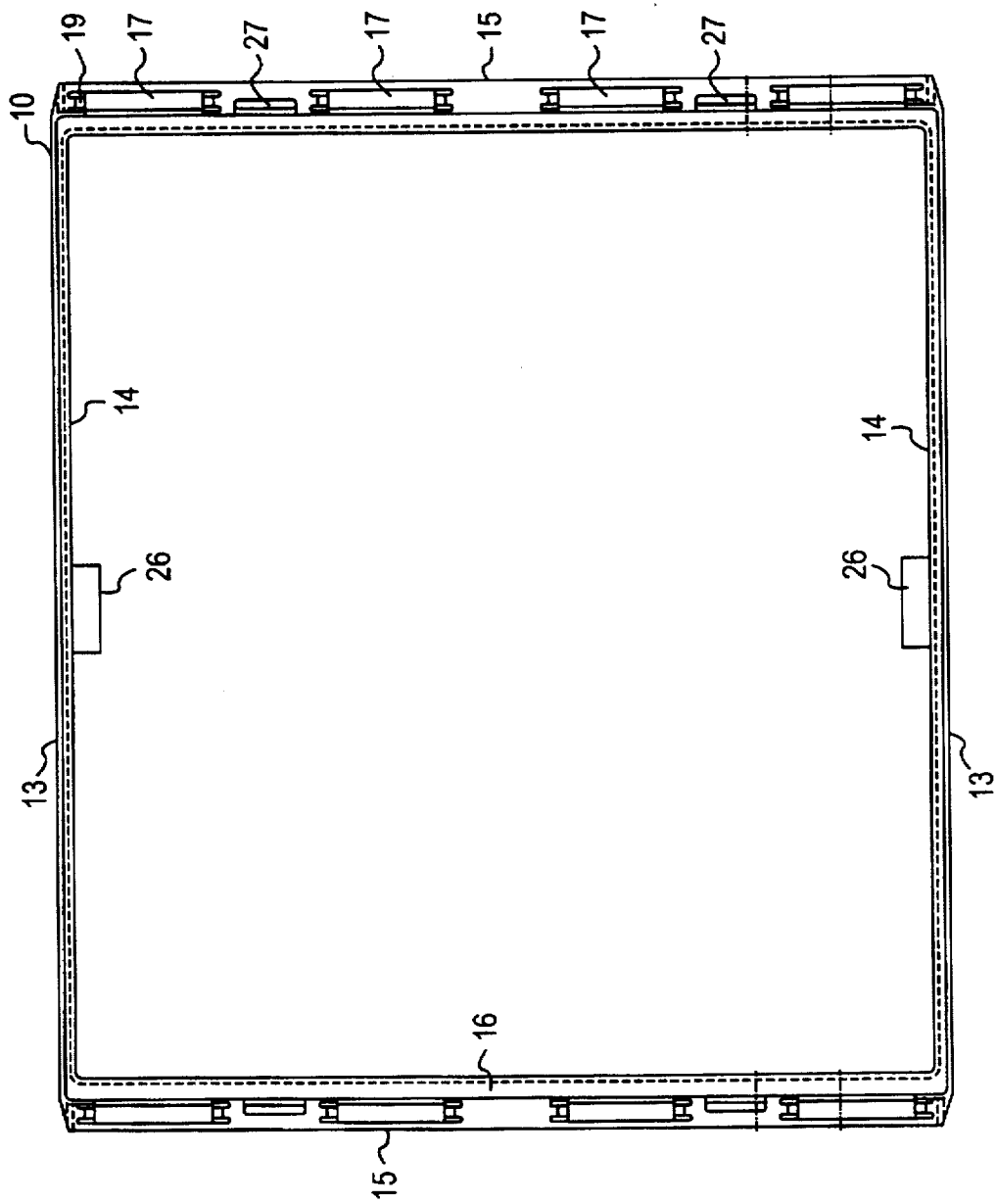
FIG. 9 is a top plan view of the base of the container constructed according to the preferred embodiment of the present invention without the support members mounted on the base.

Base 10 has a bottom wall 11, as shown in FIGS. 1 and 2 and in greater detail in FIG. 9. Bottom wall 11 preferably has an open support grid structure of a suitable design, not specifically shown in FIG. 9, and further includes a peripheral bottom wall edge 12 that extends around the periphery of bottom wall 11. Base 10 further includes opposite side walls 13, which are identical except for being in mirror image of one another and end walls 15 that are likewise identical to one another except for being in mirror image to one another.

Figure 3:
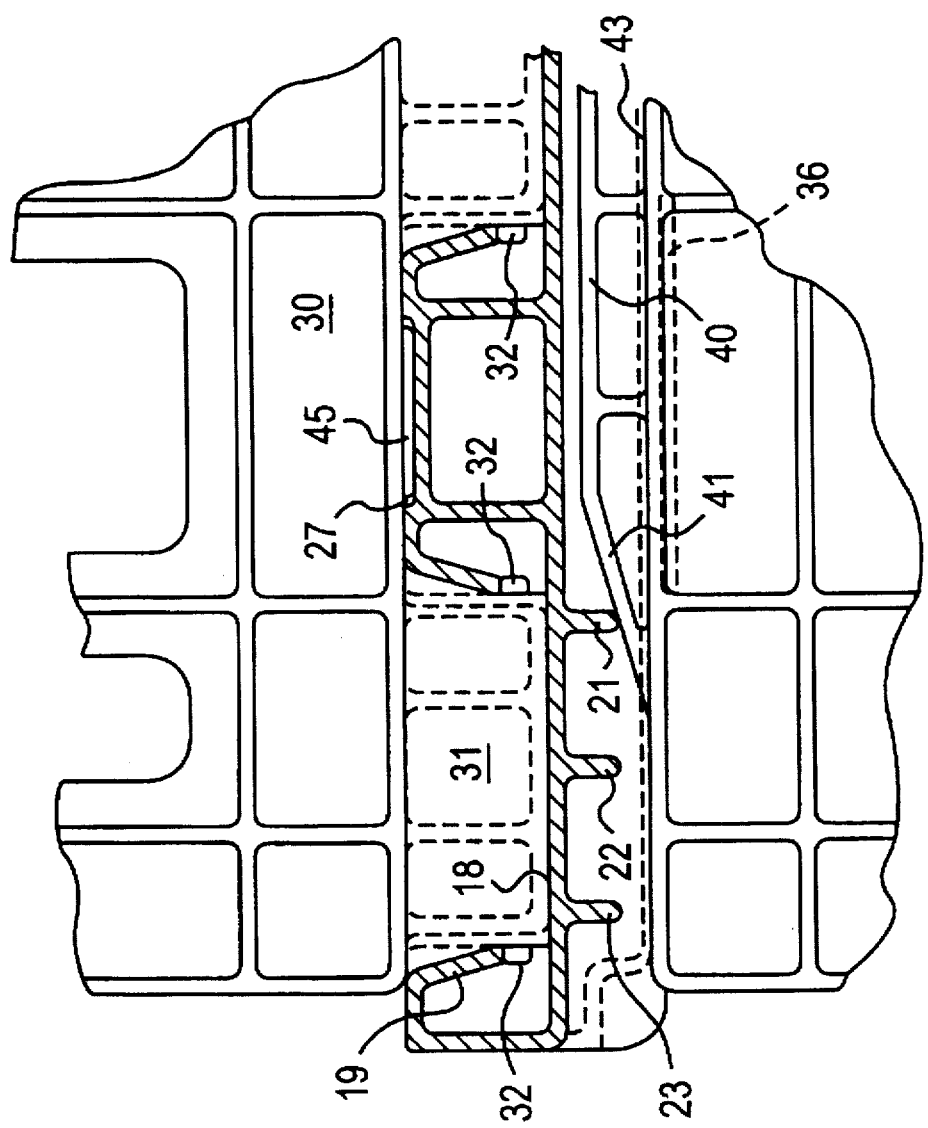
FIG. 3 is a detailed portion of the end elevation view of FIG. 2.
Figure 4:
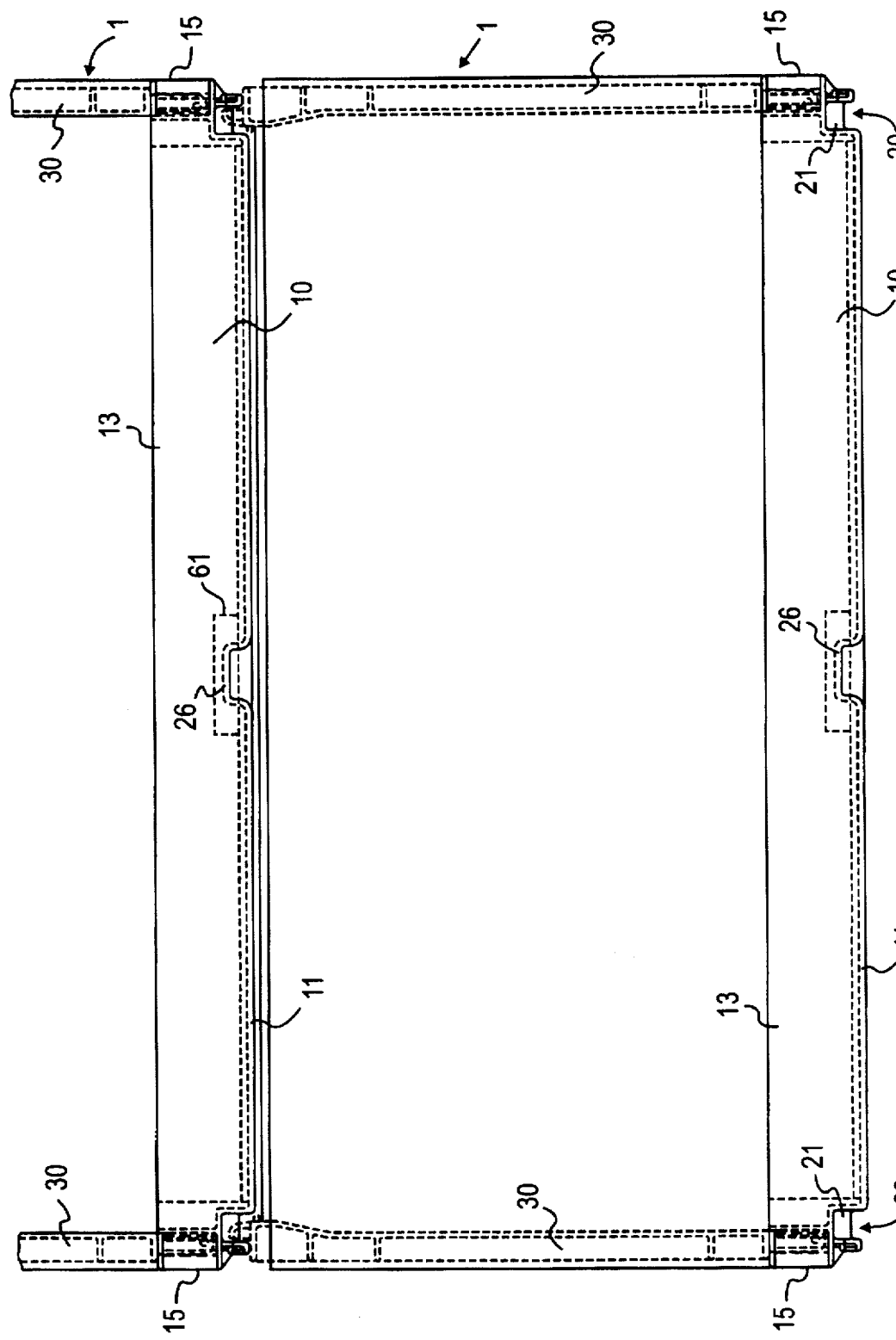
FIG. 4 is a side elevation view of two assembled containers as shown in FIG. 1 stacked on top of one another, wherein the upper stacked container is in partial view.
Figure 5:
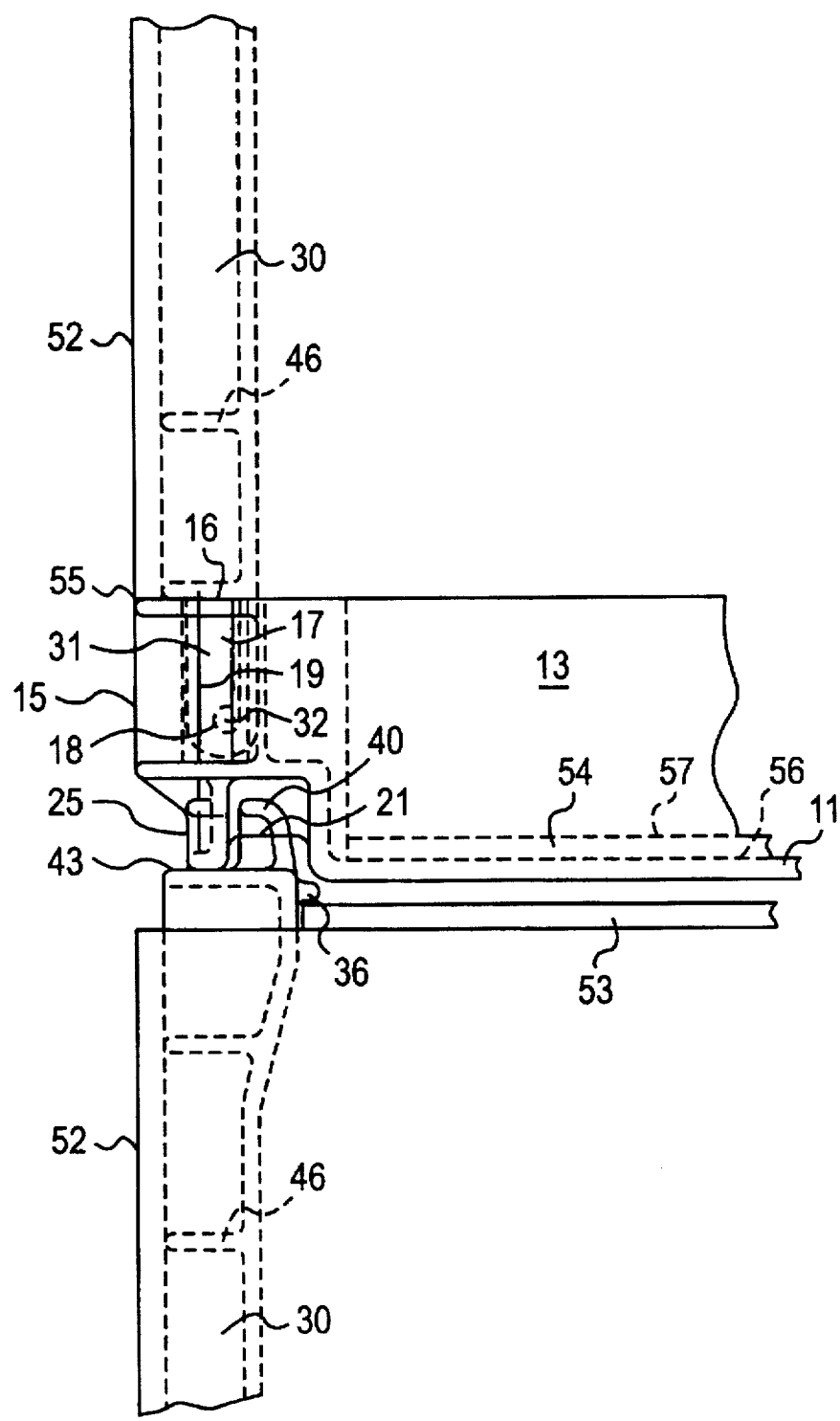
FIG. 5 is a detailed view of a portion of the side elevation view shown in FIG. 4.

With reference to FIGS. 1–8, the support members 30 are shown hingedly mounted to the end walls 15 of base 10 by inserting pintels 31, shown in detail in FIGS. 10–13, of the support members into hinge recesses 17 formed in the top face of the end walls 15. The assembly of the pintels 31 of support members to the base 10 uses a construction disclosed in U.S. Pat. No. 5,094,356, explained with reference to FIGS. 3 and 9 as follows. As shown in FIG. 3, pintels 31 have pins 32 that are received in cantilevered support flanges 19 of the base 10, and when the pintels 31 are pushed downwardly into the hinge recesses 17, the pintel pins 32 slide along the flanges 19 until passing the terminal end portions thereof to lock the pins in place. As shown in FIG. 5, in an enlarged view, the hinge recesses 17 have a bottom wall flange portion 18 that is curved to receive the hinge pins 32 for permitting rotation of support members 30.

Figure 10:
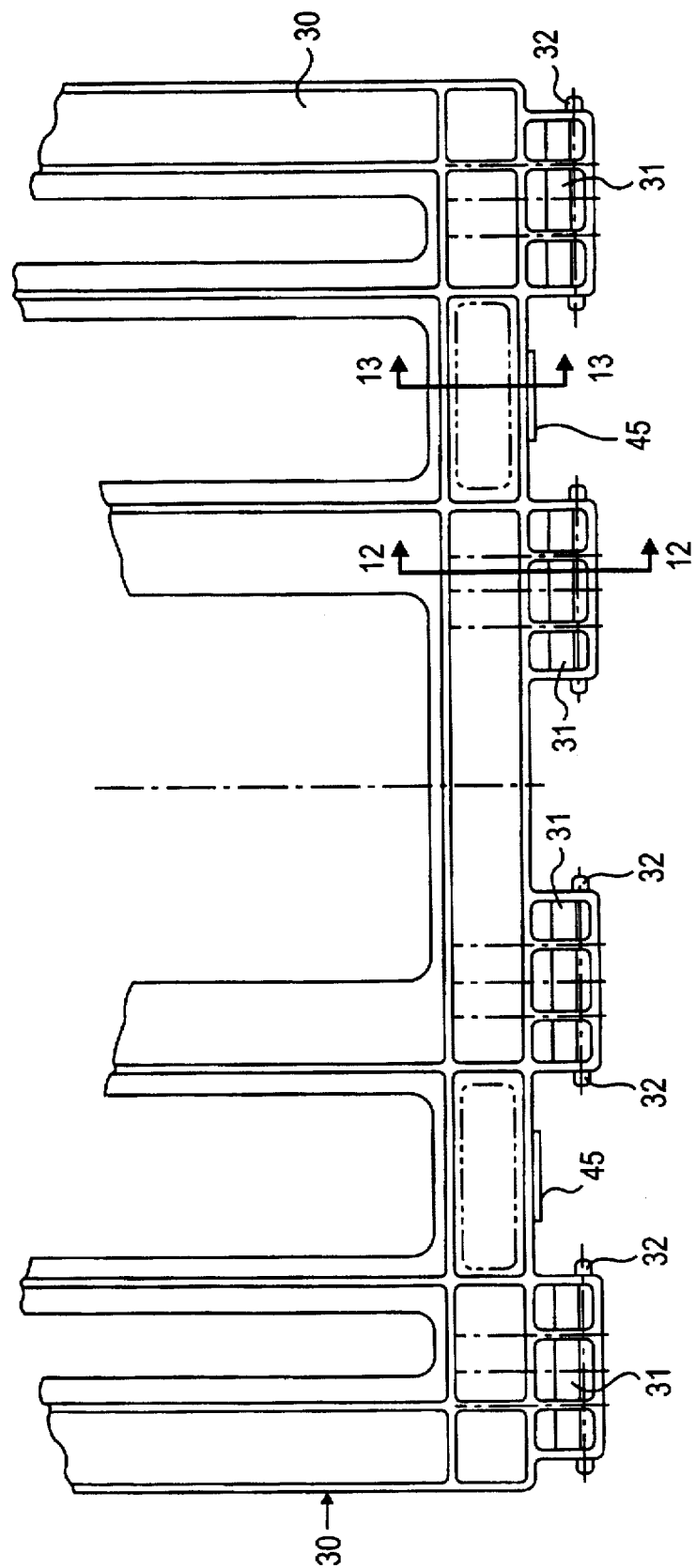
FIG. 10 is a partial elevation view of a support member constructed according to the embodiment of the invention shown in FIG. 1, showing the hinge mounting structure.

When assembling the container, the support members 30 are rotated into the position shown in FIG. 2, for example, and the support members 30 have detent flanges 45 as shown in FIG. 10 that are received within grooves 27 of the top face of the end walls 15 of base 10, as shown in FIG. 2. This enables the support members to be held in their upright position, generally perpendicular to bottom wall 11 of base 10, while the over sleeve 50 is positioned onto the base around the support members 30. The detent also assists in also maintaining the upright position of support members 30 as produce is packed into the container.

As shown in FIGS. 1 and 2, in general, and in particular in FIGS. 4 and 5, the containers can be stacked when filled with produce in a stable manner that prevents the contents from being crushed, while also permitting high stacks to be stably formed. In this regard, over sleeve 50 has side wall portions 51 that extend between support members 30 and end wall portions 52 that slide over the exterior face of support members 30. Since over sleeve 50, as shown in top view in FIG. 15, extends about the periphery of the container to provide the side and end walls thereof, the structural rigidity of the side and end walls of the container is maintained when the produce contained therein pushes outwardly against the walls.

Figure 14:
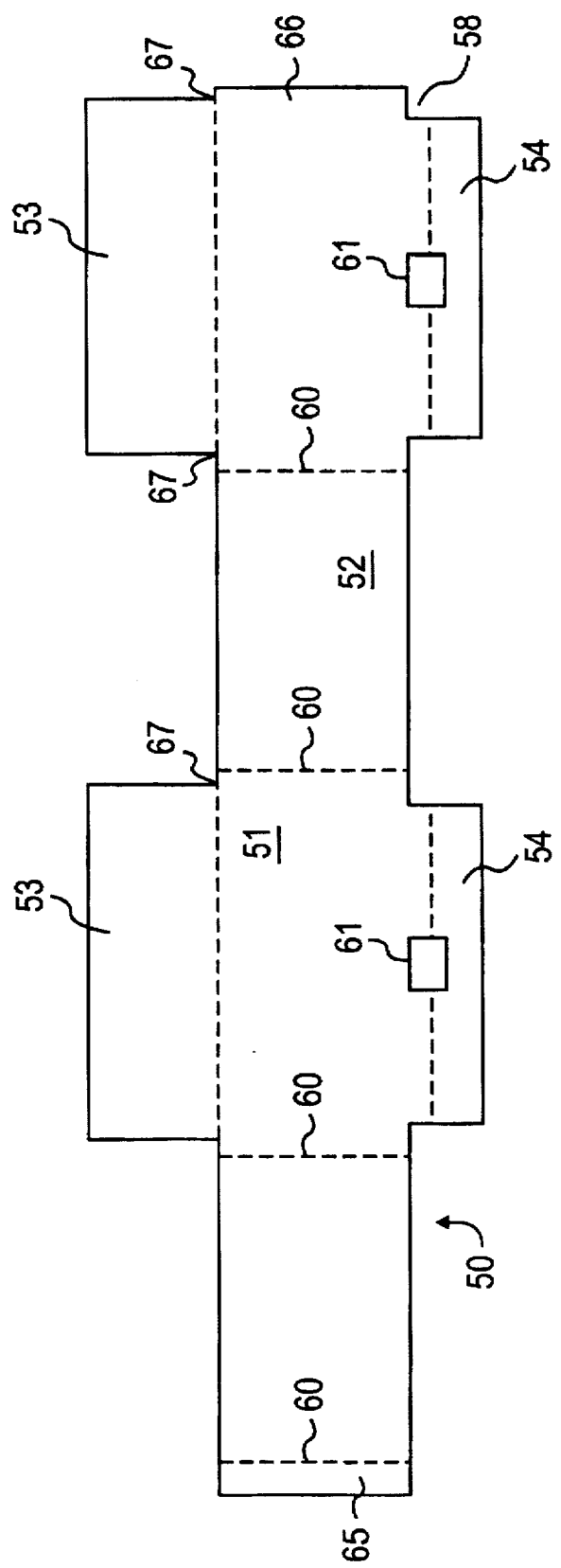
FIG. 14 is a view of a blank of the over sleeve according to the embodiment of FIG. 1.
Figure 15:
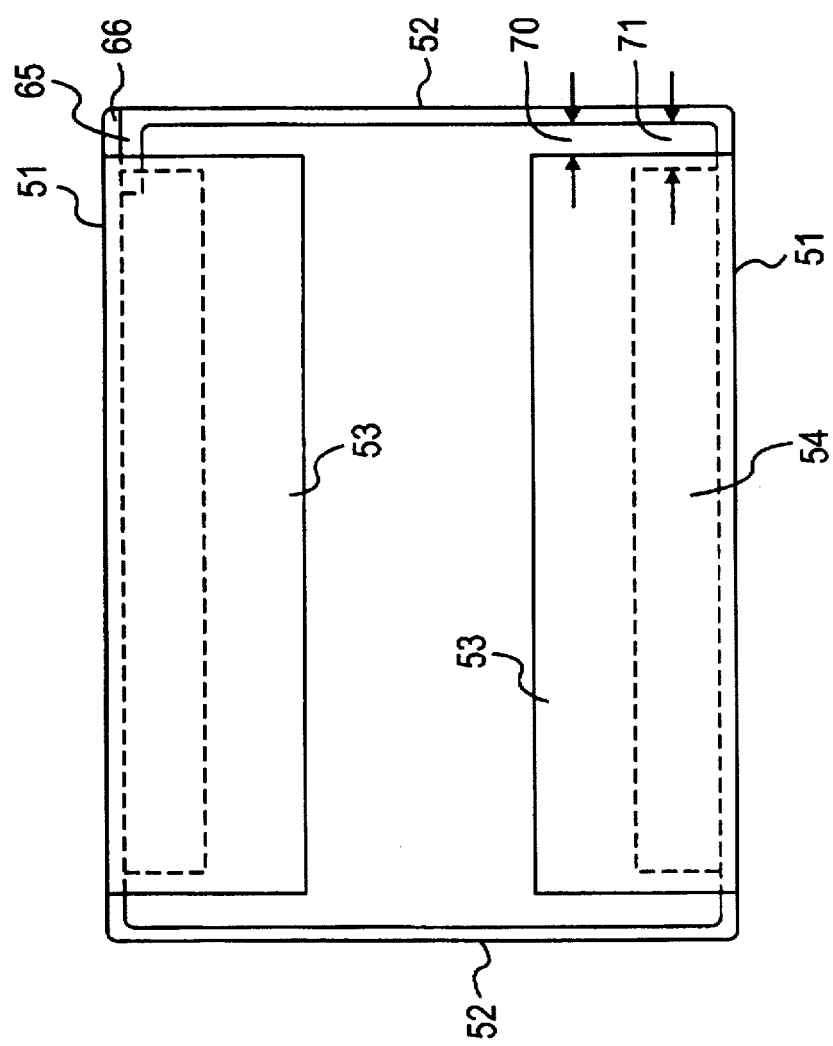
FIG. 15 is a top view of an over sleeve constructed according to the embodiment of FIG. 1 from the blank shown in FIG. 13.

According to the preferred embodiment of the invention as shown in FIG. 15, for example, over sleeve 50 has lid flaps 53 that fold over to partially cover the top of the container and that are held in place by lid flap holding flanges 36, shown in FIG. 1. Also, over sleeve 50 has bottom wall flaps 54 shown in FIG. 2. The details of the over sleeve are shown in FIGS. 1, 2, 14 and 15, which show the bottom edge 55 of the end walls 52 engage a top edge 16 of end walls 15. Further, the bottom edge 56 of the side walls 52 fit into base 10 by extending inwardly along an inside edge 14 of side walls 13 to a fold line 57 of the bottom flaps 54 that is adjacent the bottom wall edge 12 of the base along the side walls 13 of the base. As shown in FIGS. 14 and 15, as well as in FIGS. 1, 4 and 5, the cutouts 58 enable the bottom flaps 54 of the over sleeve 50 to be inwardly offset with respect to the corner fold line 60 between the end walls and side walls 51, 52 of the over sleeve.

The offset provided by the cutouts 58 enables the bottom flaps 54 to extend inwardly along the bottom wall 11 of the base to lie flat against the bottom wall of the base. A cutout 61 is also provided at the mid portion of the base to avoid interference with a raised portion 26 that is provided adjacent the side walls 13 of the bases for nested stacking of the bases 10, as will be described in greater detail hereinafter.

With the bottom flaps 54 extending along the bottom wall 11 of the base 10, particularly with the fold line 57 of the bottom flaps being adjacent the bottom wall edge 12, the produce packed within the container maintains the over sleeve 50 in engagement with base 10, thereby otherwise preventing the over sleeve 50 from riding upwardly during use of the assembled container.

Figure 6:
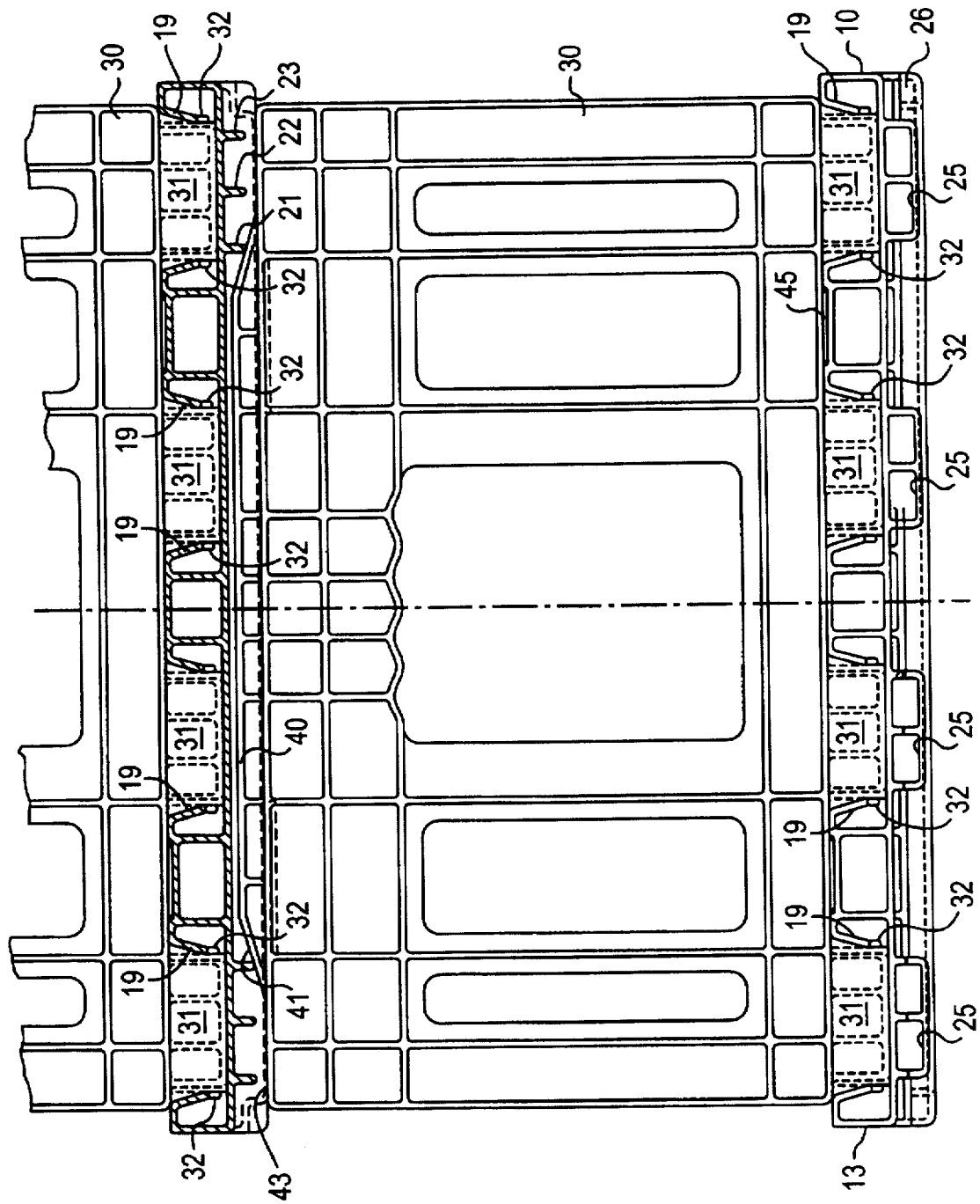
FIG. 6 is an end view of two base parts of the container with the support members in an upright position showing stacking of two base part members with the outer sleeve portion of the container omitted, wherein the upper stacked base is shown in partial view.
Figure 7:
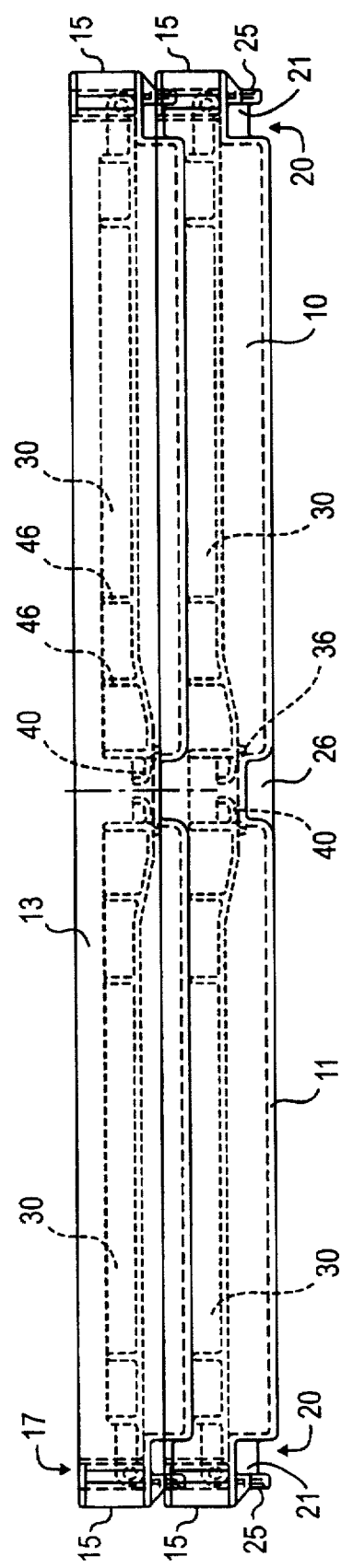
FIG. 7 is a side view of two base members embodied as shown in FIG. 1 with the over sleeve parts of the containers removed shown in a nested stack with the support members positioned for nested stacking.

When the containers are full, they can be stacked as shown in FIGS. 4 and 5, and as also shown in FIG. 6, wherein the over sleeve 50 (omitted for clarity), so that the containers function as if they were trays for stacking. In this regard, the end walls 15 of the base 10 have stacking grooves 20 that are conventionally used with bakery trays that receive stacking rails 40, as shown in FIGS. 2 and 6. Stacking rail 40 has opposite sloped portions 41 to permit a base 10 of a top container to be slid across the top of the support members 30 of a lower container for securing stacking by feel, rather than by direct visual observation. i.e. by blind stacking.

In particular, stacking groove 20 has stacking groove flanges 21, 22 and 23 that engage the stacking rail 40 during blind stacking of one container onto another, and further stacking groove flanges 21 engage sloped portions 41 of stacking rail 40 to stably center one container onto a lower container for forming the stack of container. The centering of one container onto another container by engagement of the flanges 21 and the sloping part 41 of the stacking rail 40 is shown in FIG. 6.

The stacking of one container onto another is also shown in FIGS. 4 and 5, and in particular the detail of FIG. 5 shows the engagement of end wall bottom flanges 25 with the top surface 43 of support members 30 for supporting the vertical load of the stack of containers. Also, the adjacent relation between stacking rail 41 and stacking groove 20, as well as the engagement between stacking groove flange 21 and the sloped portions 41 of the stacking rails 40 assist in maintaining side to side stability of a stack of containers. Thus, according to the preferred embodiment of the present invention, the reusable plastic part of the assembled container in combination with the disposable cardboard part of the container provides a strong structural container that can be stacked without causing damage to the contents of the produce contained therein.

Figure 13:
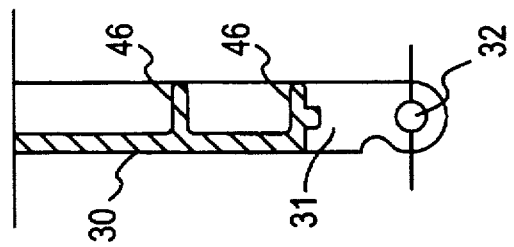
FIG. 13 is a sectional view of the support member taken along lines 12—12 in FIG. 9.
Figure 12:
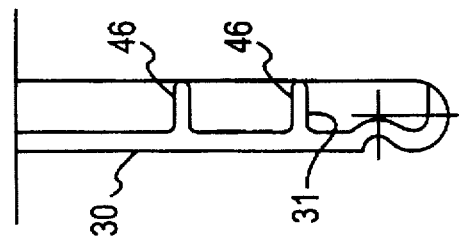
FIG. 12 is a partial sectional view of the support member shown in FIG. 9 and taken along lines 11—11.
Figure 11:
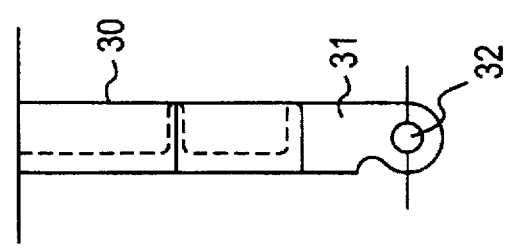
FIG. 11 is a partial side view of the support member shown in FIG. 9.

FIG. 11 shows a side view of one support member 30 and in particular the hinge pins 32. FIG. 12 shows the cross sectional view of support member 30 taken along line 12—12 as shown in FIG. 10. FIG. 13 also shows the partial cross sectional view of support member 30 taken along line 13—13 of FIG. 10. The support member includes open areas extending between support areas reinforced by ribs 46, for example.

As explained above, when the containers reach their end use destination, for example a retail distribution outlet, the containers are unpacked and the over sleeves 50 are discarded or recycled. Then, the support members 30 are folded back into base 10 to take the position shown in FIGS. 7 and 8. In this position, the bases 10 with the support members 30 still hingedly mounted thereon can be returned to the product supplier for assembly with over sleeves 50 into containers that can be used again.

For return, the bases 10 are stacked in nested stacks wherein the bottom wall 11 of an upper base 10 is received within the open top of a lower base. The ribs 46 of the support members of a lower base 10 provide support for the bottom wall 11 of an upper base. Further, the support members 30, when in the position shown in FIGS. 7 and 8, have the side portions of the stacking rails 40 engaging the raised portion 26 formed in the bottom wall of the bases to provide additional support for the support members and to maintain them in substantially parallel relation to the bottom wall 11.

Figure 8:
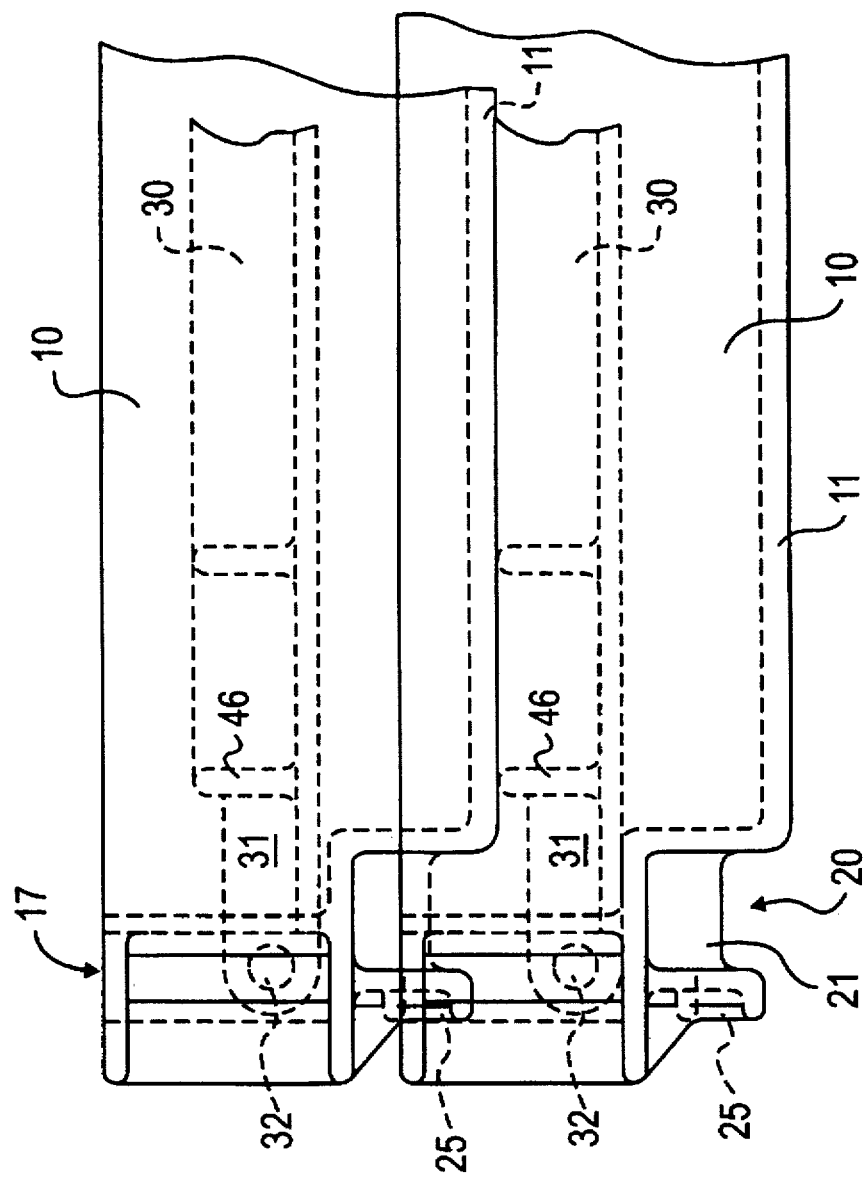
FIG. 8 is an enlarged partial side view of the two bases with support members shown in the nested stack positioned in FIG. 7.

As shown in FIGS. 8, the end wall bottom flanges 25 of the bases 10 fit within the hinge recesses 17 to enable adjacent bases to be stacked in a nested relationship.

A preferred embodiment of an over sleeve 50 is shown in FIGS. 14 and 15. FIG. 14 shows a cardboard blank from which over sleeve 50 can be formed. In particular, the blank shows the cutouts 58, bottom flaps 54 and bottom flap fold lines 57, as well as corner fold lines 60. Additionally, an extra piece 65 is provided at one end of the blank, for example, to overlap with a portion 66 at the other end of the blank when the blank is formed into the over sleeve 50. This overlap can be achieved in any suitable manner, but is shown in FIGS. 14 and 15 to be formed at a corner so that the overlapped part extends along the side wall 51 of the over sleeve.

Cutouts 67 are also provided along the top edge of the blank, and the relationship between the cutouts 58 formed at the bottom of the blank and the cutout 67 formed at the top thereof is shown in FIG. 15. In particular, the lid flaps 53 are wider than the bottom flaps 54 so that a space 70 formed between the lid flaps and the side walls 51 of the over sleeve 50 is narrower than a space 71 formed between the side of the bottom flaps 54 and the side walls 51. The reason for this is that the space 71 between the side of the bottom flap 54 and the side wall of the base 51 must accommodate the end wall structure of base 10, whereas the space 70 between the side of lid flap 53 and side wall 51 must accommodate the width of support members 30 in order for the flaps to be folded into the interior portion of the container after assembly. Of course, the dimensions with respect to the spaces 70 and 71 can be changed in accordance with the preferred embodiments of the invention, and the relationship shown in FIGS. 14 and 15 is merely set forth as an example of the preferred embodiment of the invention.

Throughout the following specification, fruit is used as an example of a product to be transported in the containers that are the subject of the invention, however it is understood that the containers discussed herein and disclosed in accordance with the objects and embodiments of the invention are suitable for use in the transportation of products other than fruit, as well.

While a preferred embodiment of the invention has been set forth with specific details, further embodiments, modifications and variations are contemplated according to the broader aspects of the present invention, all as determined by the spirit and scope of the following claims.

I claim:

1. A stackable container comprising:

a base having a bottom wall and opposed side and end portions;

a pair of support members hinged to one of said side and end portions for supporting a stacking load caused when one said container is stacked on a like said container and hinge means for mounting said support members to said base;

said support members having at least two positions wherein said support members are positioned to be substantially coplanar with said base portion in a first position and rotated about said hinge means to be substantially perpendicular to said bottom wall of said base in said second position;

an outer sleeve detachable from said base portion that fits on said base part for forming a periphery of side and end walls upstanding from said base wherein said outer sleeve fits over said support members and has a bottom edge juxtaposed to the other of said side and end portions of said base;

wherein said outer sleeve is formed of cardboard and said periphery of said outer sleeve and said base part have a substantially rectangular shape; and wherein said support members are hinged by said hinge means to said end portions of said base and corresponding end walls of said outer sleeve fit over said support members to form end walls of said container, and further wherein said outer sleeve has side walls contiguous with said end walls of said outer sleeve that fit into said base along an inner side of said base side walls.

2. A container according to claim 1, wherein said base is formed of plastic and said hinge means includes said base having hinge recesses formed along said end portions for receiving hinge pintels formed along a bottom edge of said support members.

3. A container according to claim 2, wherein said hinge means include a detent for maintaining said support members in said second position.

4. A container according to claim 2, wherein a bottom wall of said base has downwardly extending flanges received in said hinge recesses of said hinge means when two said containers are stacked in a nested stack with said support members in said first position.

5. A stackable container comprising:

a base having a bottom wall and opposed side and end portions;

a pair of support members hinged to one of said side and end portions for supporting a stacking load caused when one said container is stacked on a like said container and hinge means for mounting said support members to said base;

said support members having at least two positions wherein said support members are positioned to be substantially coplanar with said base portion in a first position and rotated about said hinge means to be substantially perpendicular to said bottom wall of said base in said second position;

an outer sleeve detachable from said base portion that fits on said base part for forming a periphery of side and end walls upstanding from said base wherein said outer sleeve fits over said support members and has a bottom edge juxtaposed to the other of said side and end portions of said base;

wherein said bottom wall of said base has a stacking groove and said support members have a stacking rail, wherein said stacking groove of said base receives said stacking rail of said support members of a lower container when two of said containers are stacked on top of one another.

6. A container according to claim 5, wherein said stacking rail includes a tapered portion along each end portion thereof and said base has at least two opposed stacking groove flanges for engaging said tapered portion when two of said containers are stacked on top of one another with said support members in said second position.

7. A stackable container comprising:

a base having a bottom wall and opposed side and end portions;

a pair of support members hinged to one of said side and end portions for supporting a stacking load caused when one said container is stacked on a like said container and hinge means for mounting said support members to said base;

said support members having at least two positions wherein said support members are positioned to be substantially coplanar with said base portion in a first position and rotated about said hinge means to be substantially perpendicular to said bottom wall of said base in said second position;

an outer sleeve detachable from said base portion that fits on said base part for forming a periphery of side and end walls upstanding from said base wherein said outer sleeve fits over said support members and has a bottom edge juxtaposed to the other of said side and end portions of said base;

wherein said outer sleeve has bottom flap portions that extend inwardly to overlie a portion of said bottom wall so that contents to be contained in said container at least partially engage said bottom flaps to hold said outer sleeve in engagement with said base.

* * * * *